United States Patent
Golla et al.

(10) Patent No.: US 11,507,414 B2
(45) Date of Patent: Nov. 22, 2022

(54) CIRCUIT FOR FAST INTERRUPT HANDLING

(71) Applicant: Cadence Design Systems, Inc., San Jose, CA (US)

(72) Inventors: Robert T. Golla, Austin, TX (US); Thomas Martin Wicki, Palo Alto, CA (US); Jama Ismail Barreh, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 4 days.

(21) Appl. No.: 17/173,108

(22) Filed: Feb. 10, 2021

(65) Prior Publication Data

US 2022/0164220 A1 May 26, 2022

Related U.S. Application Data

(60) Provisional application No. 63/118,171, filed on Nov. 25, 2020.

(51) Int. Cl.
*G06F 13/40* (2006.01)
*G06F 9/48* (2006.01)
*G06F 9/30* (2018.01)

(52) U.S. Cl.
CPC ........ *G06F 9/4812* (2013.01); *G06F 9/30036* (2013.01); *G06F 9/30079* (2013.01); *G06F 9/30196* (2013.01)

(58) Field of Classification Search
None
See application file for complete search history.

(56) References Cited

U.S. PATENT DOCUMENTS

| | | | |
|---|---|---|---|
| 6,415,344 B1 * | 7/2002 | Jones | G06F 13/24 710/305 |
| 6,549,965 B1 * | 4/2003 | Jones | G06F 13/24 710/264 |
| 8,135,894 B1 | 3/2012 | Ball | |
| 8,972,642 B2 | 3/2015 | Venkumahanti et al. | |
| 10,067,812 B2 | 9/2018 | Mullarkey et al. | |
| 2004/0117701 A1 * | 6/2004 | Swoboda | G06F 11/25 714/724 |
| 2004/0128597 A1 * | 7/2004 | Swoboda | G06F 11/3688 714/724 |
| 2004/0133824 A1 * | 7/2004 | Swoboda | G06F 11/3672 714/39 |

(Continued)

*Primary Examiner* — Hyun Nam
(74) *Attorney, Agent, or Firm* — Mark H. Whittenberger; Holland & Knight LLP

(57) ABSTRACT

A circuit for fast interrupt handling is disclosed. An apparatus includes a processor circuit having an execution pipeline and a table configured to store a plurality of pointers that correspond to interrupt routines stored in a memory circuit. The apparatus further includes an interrupt redirect circuit configured to receive a plurality of interrupt requests. The interrupt redirect circuit may select a first interrupt request among a plurality of interrupt requests of a first type. The interrupt redirect circuit retrieves a pointer from the table using information associated with the request. Using the pointer, the execution pipeline retrieves first program instruction from the memory circuit to execute a particular interrupt routine.

19 Claims, 6 Drawing Sheets

(56) References Cited

U.S. PATENT DOCUMENTS

| | | | | |
|---|---|---|---|---|
| 2004/0148550 A1* | 7/2004 | Swoboda | ............ | G06F 11/3648 |
| | | | | 714/25 |
| 2013/0326101 A1* | 12/2013 | Fang | ..................... | G06F 9/3861 |
| | | | | 710/260 |
| 2014/0006668 A1* | 1/2014 | Chew | ...................... | G06F 13/24 |
| | | | | 710/269 |
| 2014/0013132 A1* | 1/2014 | de Rochemont | ... | G06F 12/0815 |
| | | | | 713/320 |
| 2022/0164220 A1* | 5/2022 | Golla | .................. | G06F 9/30079 |
| 2022/0164254 A1* | 5/2022 | Smittle | ............... | G06F 11/1405 |

\* cited by examiner

CIRCUIT FOR FAST INTERRUPT HANDLING

RELATED APPLICATION

The present application claims priority to U.S. Provisional Appl. No. 63/118,171, filed Nov. 25, 2020, the disclosure of which is incorporated by reference herein in its entirety.

BACKGROUND

Technical Field

This disclosure is related to processors, and more particularly, to handling interrupts in processors.

Description of the Related Art

An interrupt is a response to an event in a processor that requires the processor's attention. In processing an interrupt, a normal program flow may be suspended while the interrupt is handled. Various agents within a computer system, including hardware and software agents, may submit interrupt requests. An interrupt handler in the processor may accept the request, suspend current operations, and execute code known as an interrupt handler in response to the request. Upon completing the response, the processor may resume the operations that were in progress prior to handling the interrupt.

SUMMARY

A circuit for fast interrupt handling is disclosed. In one embodiment, an apparatus includes a processor circuit having an execution pipeline and a table configured to store a plurality of pointers that correspond to interrupt routines stored in a memory circuit. The apparatus further includes an interrupt redirect circuit configured to receive a plurality of interrupt requests. The interrupt redirect circuit may select a first interrupt request among a plurality of requests, the first interrupt request being of a first type. The interrupt redirect circuit retrieves a pointer from the table using information associated with the request. Using the pointer, the execution pipeline retrieves first program instruction from the memory circuit to execute a particular interrupt routine.

In one embodiment, the interrupt redirect circuit handles interrupts of the first type, while a standard interrupt handling mechanism in the processor circuit handles interrupts of other types. The interrupt redirect circuit, implemented using hardware/circuitry, may operate separately and independently of the standard interrupt handling mechanism.

BRIEF DESCRIPTION OF THE DRAWINGS

The following detailed description makes reference to the accompanying drawings, which are now briefly described.

DETAILED DESCRIPTION OF EMBODIMENTS

Figure 1:
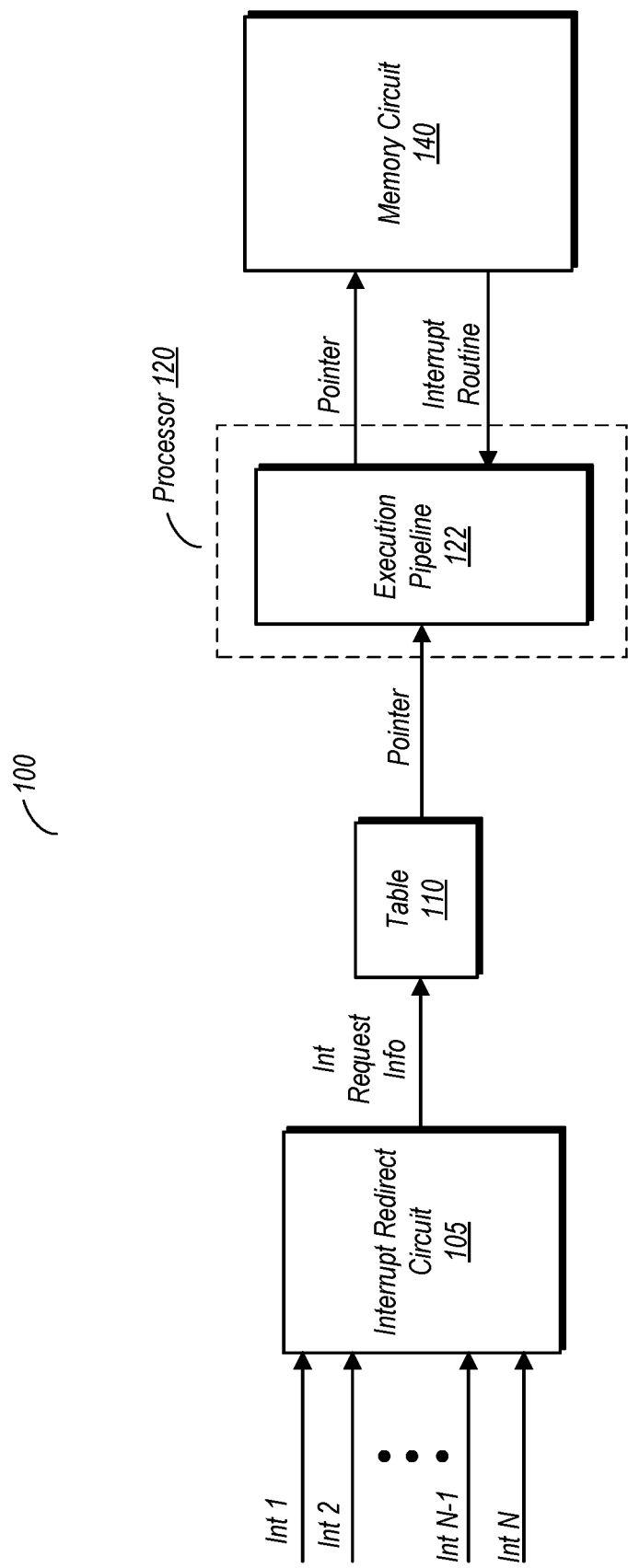
FIG. 1 is a block diagram of one embodiment of an apparatus for handling interrupts.

The present disclosure is directed toward handling interrupts in a processor. An interrupt is an event in which the processor's attention is required. Types of interrupts include polled interrupts and vectored interrupts. In a polled interrupt, the agent requesting the interrupt is not initially identified, and the processor polls the possible sources to determine its origin. For vectored interrupts, the source is identified. Some architectures have limited or no support for vectored interrupts. Meanwhile, polled interrupts have a significant performance penalty.

The handling of polled interrupts may be performed in a significant part by software, which contributes to the performance penalty mentioned above. The present disclosure utilizes the insight that dedicated hardware circuitry can perform tasks faster than software. Accordingly, a hardware circuit for handling interrupts, e.g., vectored interrupts, is disclosed. The hardware circuit may receive interrupt requests from a number of different requestors, which may be external to the processor. Arbitration between the interrupt requests may be conducted based on priority. Using an identity of a winning interrupt request, an address may be generated to locate a pointer in a memory internal to the processor, e.g., a closely coupled memory. The pointer may indicate a location (e.g., a start address) in a memory hierarchy from which a corresponding interrupt handler, or interrupt routine, may be accessed. An execution pipeline may execute a load instruction to retrieve the corresponding pointer and subsequently use the pointer to retrieve an interrupt handler from a memory. The interrupt routine may then be executed to service the interrupt request.

Using the dedicated circuitry of the interrupt redirect circuit, interrupts may be processed in significantly less time than standard interrupt handling mechanisms. The number of machine cycles, from the time an interrupt request is selected to the time the corresponding interrupt handler is executed, may be reduced by a large number due to the fact that the disclosed interrupt redirect circuit is implemented using circuitry and independent of interrupt mechanisms that utilize software. For example, in one embodiment, the time from when an interrupt request is selected to the time that the processor begins a fetch of the corresponding interrupt handler may be as few as four machine cycles, in contrast to more than twenty machine cycles using a standard interrupt processing mechanism. Furthermore, whereas the standard mechanism causes multiple flushes of the execution pipeline, the interrupt redirect circuit of the present disclosure may perform the same operations in as little as a single pipeline flush. Furthermore, the interrupt redirect circuit disclosed herein may provide support for handling vectored interrupts in processors that otherwise have no such support.

Various embodiments of a hardware circuit for handling interrupts are discussed in further detail below. Further discussion is provided with respect to a processor in which the hardware circuit can be implemented, as are methods of operating such a hardware circuit.

Interrupt Redirect Circuit

FIG. 1 is a block diagram of one embodiment of an apparatus that includes an interrupt redirect circuit. In the embodiment shown, an interrupt redirect circuit 105 is coupled to receive a number of different interrupt requests, shown here as Int 1, Int 2, etc., up to Int N, for a total of N different possible interrupt requests. These requests may, in one embodiment, be received from requestors (e.g., peripherals) external to a processor, and may be received via dedicated signal lines. The apparatus further includes a table 110, an execution pipeline 122 implemented in a processor 120, and a memory circuit 140. It is noted that in some embodiments, additional ones of the components shown may be implemented within processor 120. It is further noted that, in some embodiments, table 110 may be implemented within memory circuit 140, for example, embodiments in which memory circuit 140 is implemented within processor 120.

Interrupt redirect circuit 105 in the embodiment shown is configured to select, from among a number of interrupt requests received, a particular interrupt request to be processed. In one embodiment, interrupt redirect circuit 105 includes arbitration circuitry configured to select one of a number of different interrupt requests using an arbitration routine. The arbitration routine may be based on priority, with an interrupt request having a highest priority level being selected first. Other arbitration schemes may be implemented as well, either in addition to the priority-based scheme or as an alternative thereto. For example, an embodiment having a priority-based arbitration scheme may also select interrupts based on the amount of time they have been pending in the event that two or more different interrupt requests have the same priority level. It is further noted that any arbitration circuitry implemented in interrupt redirect circuit may automatically select an interrupt request for servicing when no other interrupt requests are pending.

After selecting an interrupt request for servicing, interrupt redirect circuit 105 may generate information regarding the request. In particular, a selected interrupt request may have a unique identifier that corresponds to, e.g., the requestor from which it was submitted. This information may, in one embodiment, be concatenated with a base address to form an address in table 110 from which a pointer may be obtained. The pointer may, in one embodiment, indicate a start address or location in a memory hierarchy from which a corresponding interrupt routine may be accessed.

The information received from interrupt redirect circuit 105 may be used to obtain the pointer from table 110. In one embodiment, table 110 may be implemented in a closely coupled memory (CCM) within a processor. Unlike a cache memory, the CCM (which may be a data CCM, or DCCM) may be arranged such that data remains stored therein, and thus there is no possibility of a miss. Accordingly, the latency associated with accessing information from a CCM may be very small and very predictable, as opposed to the latency associated with a cache when a miss occurs. In the embodiment shown, table 110 stores a number of pointers that each correspond with interrupts for which interrupt redirect circuit 105 may receive requests. These pointers may be memory addresses at which a corresponding interrupt routine, or interrupt handler, may be stored. The interrupt routines may in some embodiments be stored within a CCM, although embodiments in which these routines are stored in other memories (e.g., cacheable main memory) are also possible and contemplated. In some apparatus embodiments, both a DCCM and an instruction CCM (ICCM) may be implemented, with interrupt routines being stored in the latter.

The pointer corresponding to the selected interrupt request may be received by execution pipeline 122 in processor 120. In one embodiment, execution pipeline 122 may retrieve the pointer from table 110 by executing a load instruction (e.g., in load-store architectures having a load-store circuit). Using the pointer, execution pipeline 122 may then execute an instruction fetch to load the interrupt routine from memory circuit 140. It is noted that multiple fetches may be performed for interrupt handlers having multiple instructions. After fetching the interrupt routine, execution pipeline 122 may execute the interrupt routine to complete servicing of the interrupt request.

In various embodiments, the interrupt requests received by interrupt redirect circuit 105 may be for vectored interrupts, being received from their corresponding requestors. More generally, the interrupt requests received by interrupt redirect circuit 105 may be of a first type, as opposed to other types of interrupts that may be handled by other mechanisms within a computer system in which apparatus 100 is implemented. For example, the first type of interrupt may be the previously mentioned vectored interrupts, while a second type of interrupt may be polled interrupts. Interrupt redirect circuit 105 may begin the processing of the vectored interrupt requests independent of any other interrupt handling mechanism implemented in the computer system/processor in which apparatus 100 is implemented.

In processing an interrupt request, interrupt redirect circuit 105 is configured to perform various actions on execution pipeline 122, an embodiment of which is discussed in further detail below. When an interrupt request is selected in the embodiment shown, interrupt redirect circuit 105 may cause a decode unit in execution pipeline 122 to stall, e.g., to temporarily discontinue decode of instructions. Furthermore, interrupt redirect circuit 105 may cause a flush of execution pipeline 122. After the flush, execution pipeline 122 may execute a load instruction to load a pointer from table 110 (based on the address provided thereto by interrupt redirect circuit 105), and subsequently execute an instruction fetch to obtain the instructions of the corresponding interrupt routine from a location in a memory indicated by the pointer itself.

Figure 2:
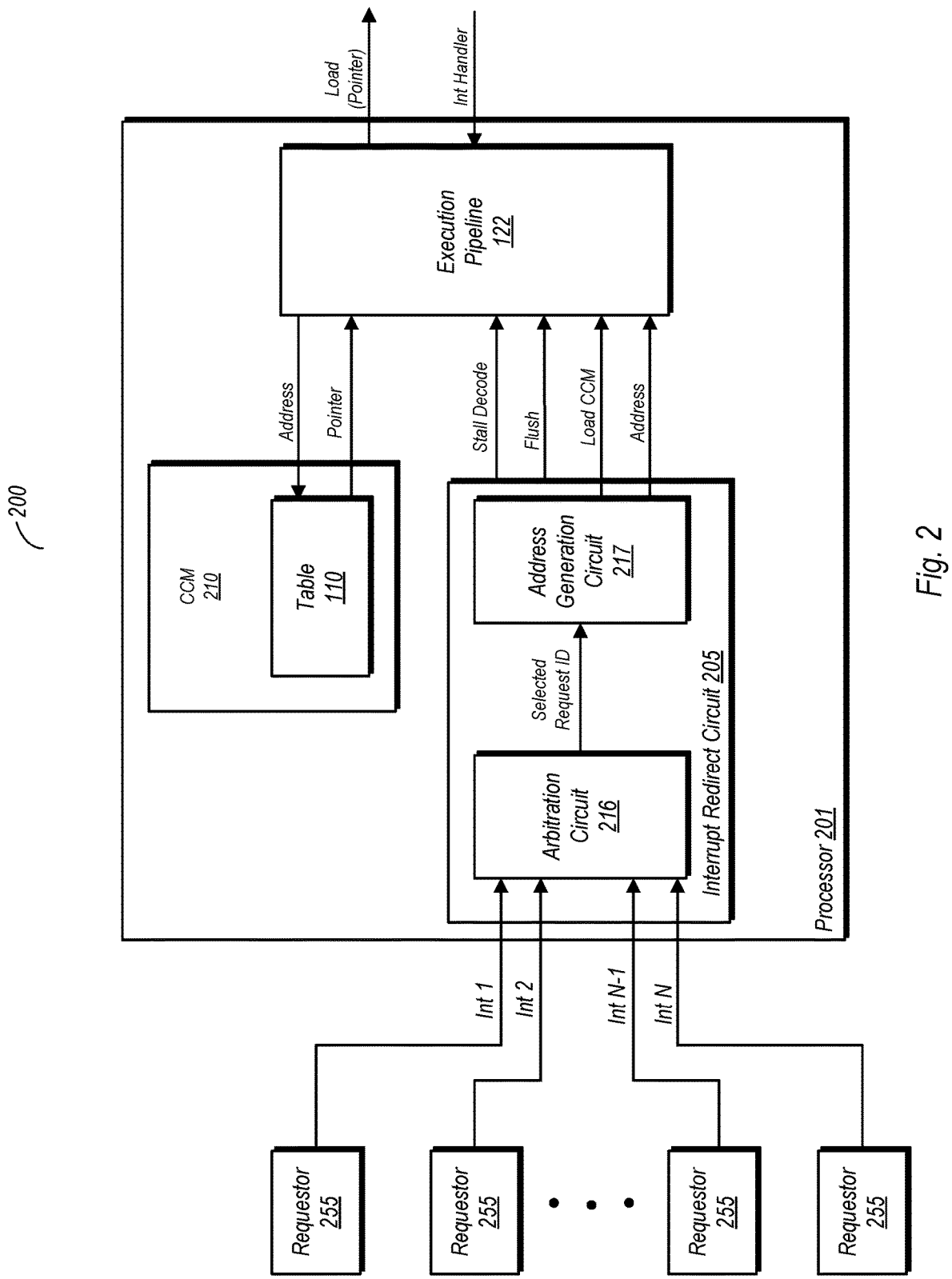
FIG. 2 is a block diagram of one embodiment of a processor.

FIG. 2 is another embodiment of an apparatus that includes an interrupt redirect circuit. In the embodiment shown, apparatus 200 includes a processor 201 and a number of requestors 255. An embodiment of an interrupt redirect circuit 205, including an arbitration circuit 216 and an address generation circuit 217 is also provided. An execution pipeline 122 is also included in processor 201. Additionally, processor 201 includes a CCM 210, which stores the contents of table 110. Table 110 in the embodiment shown stores pointers indicating locations of interrupt routines used to service interrupt requests received from various ones of the requestors 255. In some embodiments, CCM 210 may be subdivided into data and instruction CCMs to store data and instructions, respectively.

The requestors 255 in the embodiment shown may be peripheral devices and/or other components external to processor 201. Embodiments are also possible and contemplated in which processor 201 is part of a system-on-a-chip (SoC), and thus at least some of the requestors 255 may be implemented on the same integrated circuit die as processor 201 itself.

The requestors 255 in the embodiment shown are configured to provide, via dedicated signal lines, corresponding interrupt requests to an interrupt redirect circuit 205 implemented in processor 201. Interrupt redirect circuit 205 in the embodiment shown includes circuitry dedicated to handling particular types of interrupt requests, such as requests for servicing of vectored interrupts. The circuitry of interrupt redirect circuit 205 may operate independent from any software-based or other interrupt handling mechanisms implemented in processor 201 that are used to handle other types of interrupt requests (e.g., polled interrupts). Put another way, interrupt requests of the type processed by interrupt redirect circuit 205 may completely bypass (and may be invisible to) any other interrupt handling mechanism implemented in processor 201.

The interrupt requests may be initially received by an arbitration circuit 216. Arbitration circuit 216 in the embodiment shown implements circuitry that performs one or more arbitration routines. When a plurality of interrupt requests are pending, the circuitry of arbitration circuit 216 may select a winning request based on a priority level. In instances where multiple interrupt requests have the same priority level, additional arbitration may be performed based on, e.g., amount of time the requests have been pending (with the oldest request processed first), a round robin arbitration scheme, or other type. Arbitration circuit 216 may be implemented entirely in circuitry in various embodiments, and may thus need no programming or other software support.

Each interrupt request received by arbitration circuit 216 has an identifier that may indicate from which of requestors 255 the interrupt request was received. The selected request identification information is provided by arbitration circuit 216 to address generation circuit 217. Address generation circuit 217 may concatenate the identification information for the selected request along with a base address to form an address from which a pointer to a corresponding interrupt routine can be accessed. In some embodiments, the address may instead be calculated based on the identification information (e.g., if the address is not properly aligned). In one embodiment, address generation circuit 217 includes a base address register which stores this base address, and further includes circuitry to concatenate its contents with the request identification information.

Responsive to an interrupt request, interrupt redirect circuit 205 may send a signal to stall decode operations in execution pipeline 122, and may also send another signal to flush the execution pipeline of currently pending instructions and corresponding data/operands. When the address of the pointer for the corresponding interrupt request has been generated, address generation circuit 217 may provide the address and a signal to execute a load instruction to load the appropriate pointer from table 110 in CCM 210. Execution pipeline 122 may respond by executing a load instruction in which the address is provided to table 110 and the pointer associated with the interrupt request is returned. After receiving the pointer, execution pipeline 122 may execute an instruction fetch (or fetches) to obtain the contents from the location indicated by the pointer. The contents, an interrupt routine, are then returned to execution pipeline 122. It is noted that multiple fetches may be performed for interrupt handlers that include multiple instructions.

The interrupt routine may, in one embodiment, be stored in a system main memory (e.g., a random access memory, or RAM), or in a cache if the particular interrupt routine is currently cached. However, embodiments are also possible and contemplated in which at least some of the interrupt routines are stored in CCM 210. In embodiments in which an ICCM is provided separately from a DCCM, the interrupt routines may be stored in the former. This may provide an additional speed advantage, as access of the interrupt routine from a CCM may be significantly faster than access from a system main memory.

As previously noted, interrupt redirect circuit 205 may operate separately and independently of any other interrupt mechanism in processor 201 which handles interrupts of a type different than those handled by the former. For example, one embodiment of processor 201 may include a programmable interrupt controller (PIC), which is a configurable interrupt controller that at least partially processes requests for polled interrupts. The PIC may perform such functions as polling the various potential requestors of a particular request to determine its origin (although this function may be carried out by execution pipeline 122 in other embodiments). Furthermore, the PIC may interact with system software (e.g., an operating system) in the processing of interrupt requests. Since interrupt redirect circuit 205 operates separately and independently for the type or types of interrupt requests it processes, it may be invisible to operating system software in some embodiments. Furthermore, the servicing of interrupt requests processed by interrupt redirect circuit 205 may occur significantly faster than interrupt requests processed by a PIC.

Processor Architecture Overview

Figure 3:
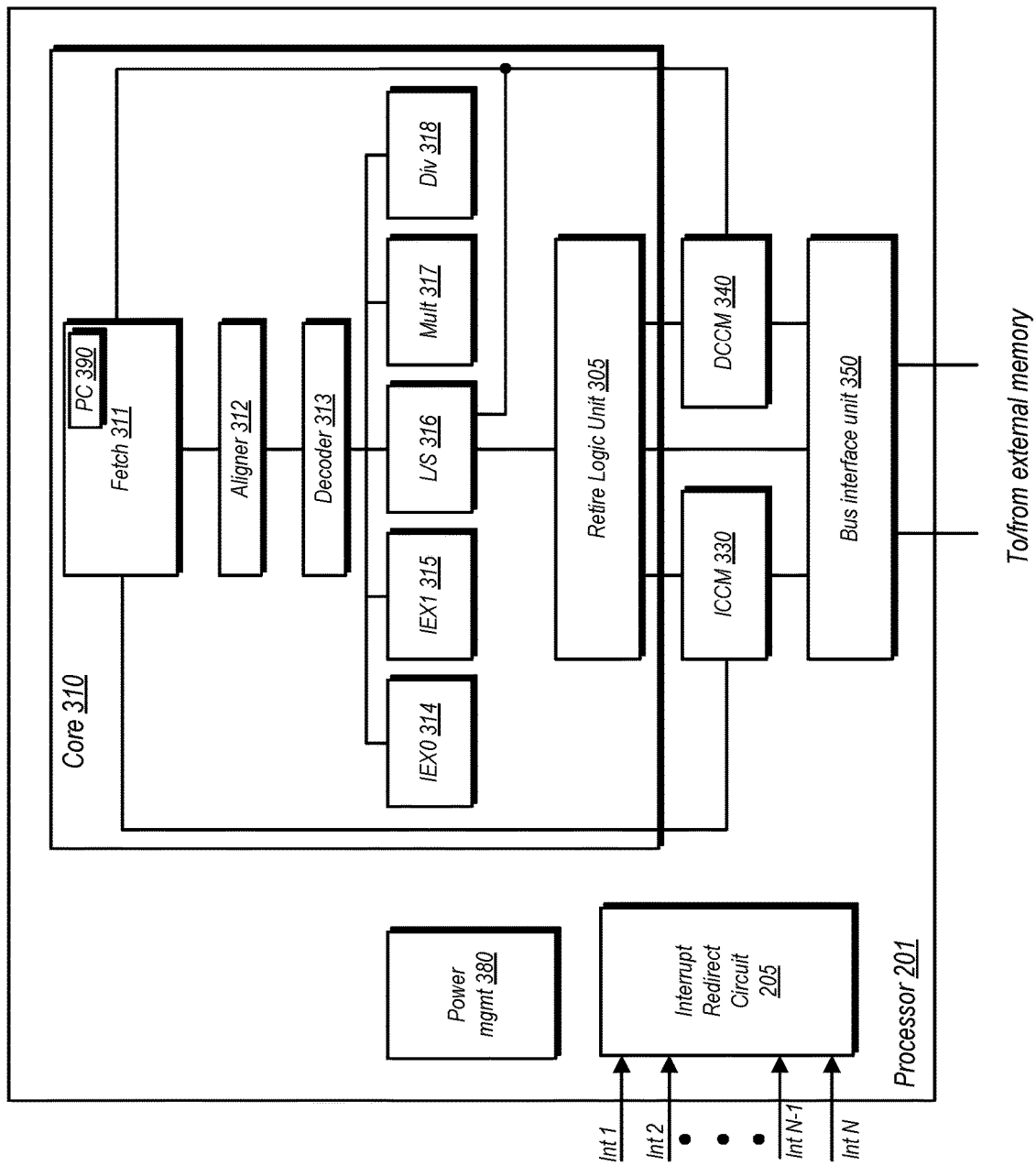
FIG. 3 is a block diagram of another embodiment of a processor.

FIG. 3 illustrates an embodiment of a processor 201 organized according to a particular microarchitecture. Preliminarily, it is noted that the microarchitecture shown in FIG. 3 represents merely one possible and non-limiting implementation. Accordingly, the disclosure herein may apply to a wide number of processor architectures, including (but not limited to) various types of RISC architectures (e.g., RISC-V), various implementations of the x86 architecture, various ARM architectures, and so on.

In the illustrated embodiment, processor 201 includes an execution core 310 having a number of circuits configured to perform various aspects of instruction execution. In particular, core 310 includes a fetch circuit 311 coupled to an aligner circuit 312, which is in turn coupled to a decoder circuit 313. Decoder circuit 313 is coupled to a number of instruction execution circuits, including first and second integer execution circuits respectively denoted IEX0 314 and IEX1 315, along with load/store circuit 316, multiplier circuit 317, and divider circuit 318. Additionally, processor 201 includes a retire logic unit 305, an instruction closely coupled memory (ICCM) 330, a data closely coupled memory (DCCM 340), a bus interface unit 350, an interrupt redirect circuit 205, and a power management circuit 380. Although not explicitly shown here, processor 201 may also include instruction and data caches used to store frequently accessed instructions and data, respectively.

Generally speaking, core 310 may be configured to fetch instructions and necessary data, execute instructions, and write results either locally (e.g., to a register file) or into a memory subsystem (which may include a DCCM, as described elsewhere herein). In particular, fetch circuit 311 may be configured to initiate this process by retrieving instructions for execution. In various embodiments, fetch circuit 311 is configured to implement program counter 390. Program counter 390 may store addresses of instructions being executed in the execution pipeline at a given time. This may include storing the address of instructions for interrupt handlers that are used to service interrupt requests.

Fetch circuit 311 may also implement branch prediction circuitry in order to track the flow of program execution and attempt to predict the outcome of conditional branches in order to speculatively fetch branch targets. For example, fetch circuit 311 may implement a "gshare"-style branch predictor in which a table of branch direction predictors is used in combination with a branch target buffer (i.e., a cache of branch target addresses) along with the current program counter and an indicator of global branch history to generate a predicted address from which to fetch instructions. Any suitable branch prediction scheme may be employed, however.

The fetch address generated by fetch circuit 311 may be directed to an instruction cache, which may be implemented as a pipelined, banked, set-associative cache that is accessed by performing an index lookup and a tag comparison to verify that the fetch address is in fact present in the cache. In the event of a cache miss, the fetch address may be sent to bus interface unit 350 to be retrieved from an external memory coupled to processor 201. In this embodiment, an instruction closely-coupled memory (ICCM) is provided in addition to or instead of an instruction cache. Generally speaking, a CCM is a storage array defined by a directly addressable region of memory addresses; it differs from a cache in that there is no possibility of an access "missing" a CCM and thus having a variable latency depending on its hit/miss status. A CCM may thus provide storage that has relatively low access latency that is also predictably consistent, unlike a cache, which may improve the performance of certain computing workloads such as real-time applications. In some embodiments, an instruction read-only memory (IROM) may be provided in addition to or instead of an ICCM; an IROM may provide similar access timing characteristics as an ICCM but has fixed contents (e.g., determined at the time of manufacture) and cannot be written to.

In some ISAs, instructions may have variable lengths. For example, the RISC-V ISA defines a set of 32-bit instructions as well as 16-bit "compressed" variants of a subset of the 32-bit instructions. Accordingly, in some embodiments, aligner circuit 312 may be configured to identify instruction boundaries within the fetch stream and extract the corresponding instructions for further processing. For example, aligner circuit 312 may be configured to identify RISC-V 16-bit compressed instructions and convert them to their uncompressed 32-bit variants for downstream processing, which may simplify later processing relative to preserving the compressed instructions in their native format.

Decoder circuit 313 may be configured to receive fetched instructions from aligner circuit 312 and decode them in order to determine how they should be further processed within core 310. For example, decoder circuit 313 may examine the operand fields of instructions in order to determine instruction dependencies that may dictate when an instruction is ready to execute; if an instruction requires a result that is not yet available, decoder circuit 313 may delay its execution (and possibly the execution of upstream instructions) until its dependencies are satisfied. In some embodiments, decoder circuit 313 may attempt to group multiple instructions for concurrent execution. To simplify the complexity of this task, some embodiments of decoder circuit 313 may limit the number of instructions issued for concurrent execution. For example, although core 310 includes multiple execution units that could in theory operate concurrently, these execution units may be grouped such that only two instructions are issued per cycle by decoder circuit 313. In other embodiments, however, such limitations may not apply.

In some embodiments, decoder circuit 313 may implement additional operations. For example, decoder circuit 313 may detect synchronization attributes of particular instructions (e.g., instructions that may have special execution timing requirements relative to other instructions in order to ensure correct execution) and appropriately stall or freeze the execution pipeline in order to enforce those attributes. In some instances, decoder circuit 313 may also include a register file configured to implement the architected registers defined by the ISA and/or control/status registers defined by the ISA or the particular processor implementation, although these features may alternatively be implemented elsewhere within core 310.

Once processed by decoder circuit 313, instructions may then be issued to the appropriate execution circuit for execution. In the illustrated embodiment, core 310 includes two integer execution circuits IEX0 314 and IEX1 315, each of which may implement circuitry for executing arithmetic, logical, and shift instructions defined by the ISA. In the illustrated embodiment, IEX0 314 and IEX1 315 are each configured to implement two arithmetic/logic units (ALUs), for a total of four ALUs. In some embodiments, the ALUs in each execution circuit may be configured to operate in successive pipeline stages rather than concurrently, in order to facilitate bypassing of results from one execution circuit to another.

In addition to the integer execution circuits, load/store circuit 316 may be configured to execute load and store instructions defined by the ISA. For example, load/store circuit 316 may be configured to perform address generation arithmetic and to present the resulting address to a data cache for processing. In some embodiments, both the instruction cache and the data cache may be implemented as a pipelined, banked, set-associative cache that is accessed by performing an index lookup and a tag comparison to verify that the address targeted by the load or store instruction is in fact present in the cache. In the event of a data cache miss, the address may be sent to bus interface unit 350 to be retrieved from an external memory coupled to processor 201. In some embodiments, a data closely-coupled memory (DCCM) may be provided in addition to or instead of a data cache. As noted above, a CCM may effectively operate as a directly addressable on-chip memory with predictable access latency, in contrast to a cache that has a variable, probabilistic access latency. In embodiments that implement only a DCCM without a data cache, accesses within the memory range associated with the DCCM may be routed to the DCCM, whereas accesses outside of that range may ultimately be handled by bus interface unit 350.

Multiplier circuit 317 may be configured to implement integer multiplication instructions defined by the ISA. Divider circuit 318 may be configured to implement integer division instructions defined by the ISA. While multiplier circuit 317 may be pipelined, integer division is typically a complex, long-latency operation. Accordingly, in the illustrated embodiment, divider circuit 318 is implemented as a non-pipelined circuit, and instructions dependent on the results of an integer division instruction will stall until the division is complete. It is noted that while floating-point arithmetic is not explicitly discussed above, embodiments of core 310 may include execution circuits that support such operations.

As shown in FIG. 3 processor 201 includes retire logic unit 305 in core 310 and interposed between various core elements and other elements of the memory hierarchy. Retire logic unit 305 may perform functions such as retiring instructions, committing results to registers, and so on.

Bus interface unit (BIU) 350 may be configured to interface processor 201 with other devices, such as memory, input/output devices, or other peripherals. External devices may either be on-chip (e.g., on the same silicon as processor 201, as in a system-on-a-chip (SoC) implementation) or off-chip. In some embodiments, BIU 350 may interface with external devices according to a version of the Advanced Microcontroller Bus Architecture (AMBA) standard, such as the Advanced High-performance Bus (AHB) bus protocol introduced in the AMBA 2 specification. Any other suitable bus architecture or protocol may be employed, however.

BIU 350 may include circuits such as load and store queues configured to store pending load and store instructions as well as state machines or other circuits configured to implement the appropriate bus transaction logic.

ICCM 330 and/or a DCCM 340 may in some embodiments be accessible via direct memory access (DMA) by off-processor devices in addition to being accessed by instructions executing in core 310. In such embodiments, processor 201 may include arbitration circuitry configured to arbitrate competing ICCM/DCCM accesses originating from processor 201 and DMA. For example, processor accesses may generally take priority over DMA accesses, although the arbitration circuitry may employ fairness and/or performance factors to ensure that DMA accesses are eventually serviced. In some embodiments, an ICCM/DCCM may be implemented in a banked manner with arbitration being performed on a per-bank basis, so that different banks may concurrently service accesses from processor 201, DMA, or a combination of these.

Processor 201 in the embodiment shown also includes interrupt redirect circuit 205. In the embodiment shown, interrupt redirect circuit 205 is configured to receive interrupt requests from a number of external requestors (e.g., peripherals), the requests labeled here as Int 1, Int 2, and so forth, up to Int N. These requests are received via dedicated signal lines. The number of requestors, and thus signal lines may vary from one embodiment to another. As discussed above, the requests received by interrupt redirect circuit 205 may be requests for vectored interrupts. As further discussed above, responsive to selecting a received interrupt request, interrupt redirect circuit 205 may cause a stall in the decode operations performed by decoder 313, a flush of the execution pipeline, and access to a pointer stored in, e.g., DCCM 340.

Lastly, power management circuit 380 may be configured to coordinate power management features across processor 201. For example, power management circuit 380 may be configured to implement support for architecturally-defined power management states and to correctly transition processor 201 across those states, e.g., by controlling the sequence in which circuits of processor 201 are energized or depowered. Power management circuit 380 may also be configured to implement other power management features that are not necessarily architecturally defined, such as detecting and depowering idle circuits in order to decrease power consumption.

Example Computing System

Figure 4:
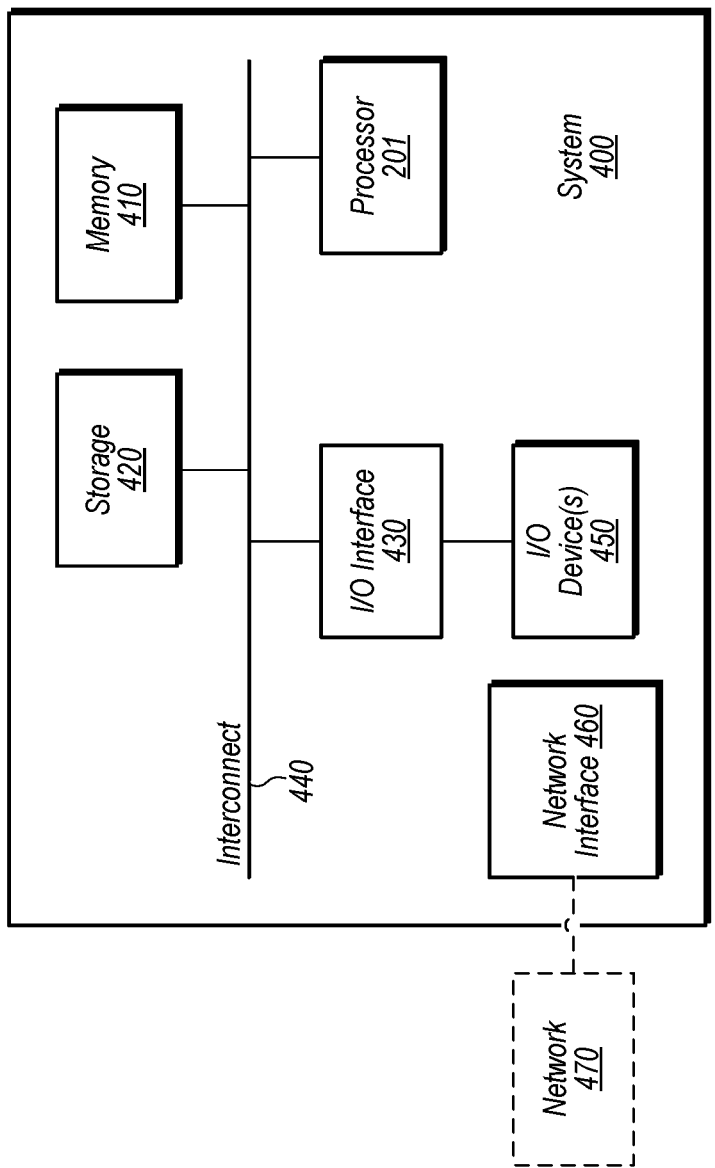
FIG. 4 is a block diagram of one embodiment of a computer system.

Processor 201 may be included within a variety of system configurations, one example of which is shown in FIG. 4. In various embodiments, system 400 may correspond to a general-purpose computer system, such as a desktop or portable computer, a mobile phone, or the like. System 400 may also correspond to any type of embedded system that may employ one or more instances of processor 201 as a dedicated controller. For example, system 400 may correspond to any type of computer peripheral device such as a mass storage device or storage array, printer, or the like, as well as control systems for automobiles, aviation, manufacturing, and other suitable applications.

As shown, system 400 includes processor 201, memory 410, storage 420, and an input/output (I/O) device interface 430 coupled via an interconnect 440. One or more I/O devices 450 are coupled via I/O interface 430. System 400 also includes a network interface 460 that may be configured to couple system 400 to a network 470 for communications with, e.g., other systems. (In various embodiments, network interface 460 may be coupled to interconnect 440 directly, via I/O interface 430, or according to a different configuration.) It is noted that some or all of the components of system 400 may be fabricated as a system-on-a-chip, although discrete combinations of components may also be employed.

Processor 201 corresponds to one or more instances of the processor configuration described above with respect to FIGS. 1-3 or a suitable variant thereof. Memory 410 may include random access memory (RAM) of any suitable configuration, such as working memory configured to store data and instructions usable by processor 201. Storage 420 may include mass storage devices such as magnetic, optical, or nonvolatile/flash memory storage, or a combination of these. In some embodiments, either of memory 410 or storage 420 may be omitted or integrated into the other as a single memory subsystem from the perspective of processor 201.

I/O interface 430 may be configured to interface between interconnect 440 and one or more other types of buses or interfaces. For example, interconnect 440 may correspond to the AHB interface discussed above (or another suitable type of high-bandwidth interconnect), and I/O interface 430 may be configured as a bridge device that enables coupling of different types of I/O devices to interconnect 440. I/O interface 430 may implement one or more interface protocols such as Universal Serial Bus, Firewire, or other suitable standards. I/O device(s) 450 may include any suitable type of storage, network interface, user interface, graphics processing, or other type of device. Network 470, if present, may be any suitable type of wired or wireless communications network, such as an Internet Protocol (IP) addressed local or wide-area network, a telecommunications network, or the like. Network interface 460, if present, may be configured to implement any suitable network interface protocol needed for communication with network 470.

Figure 5:
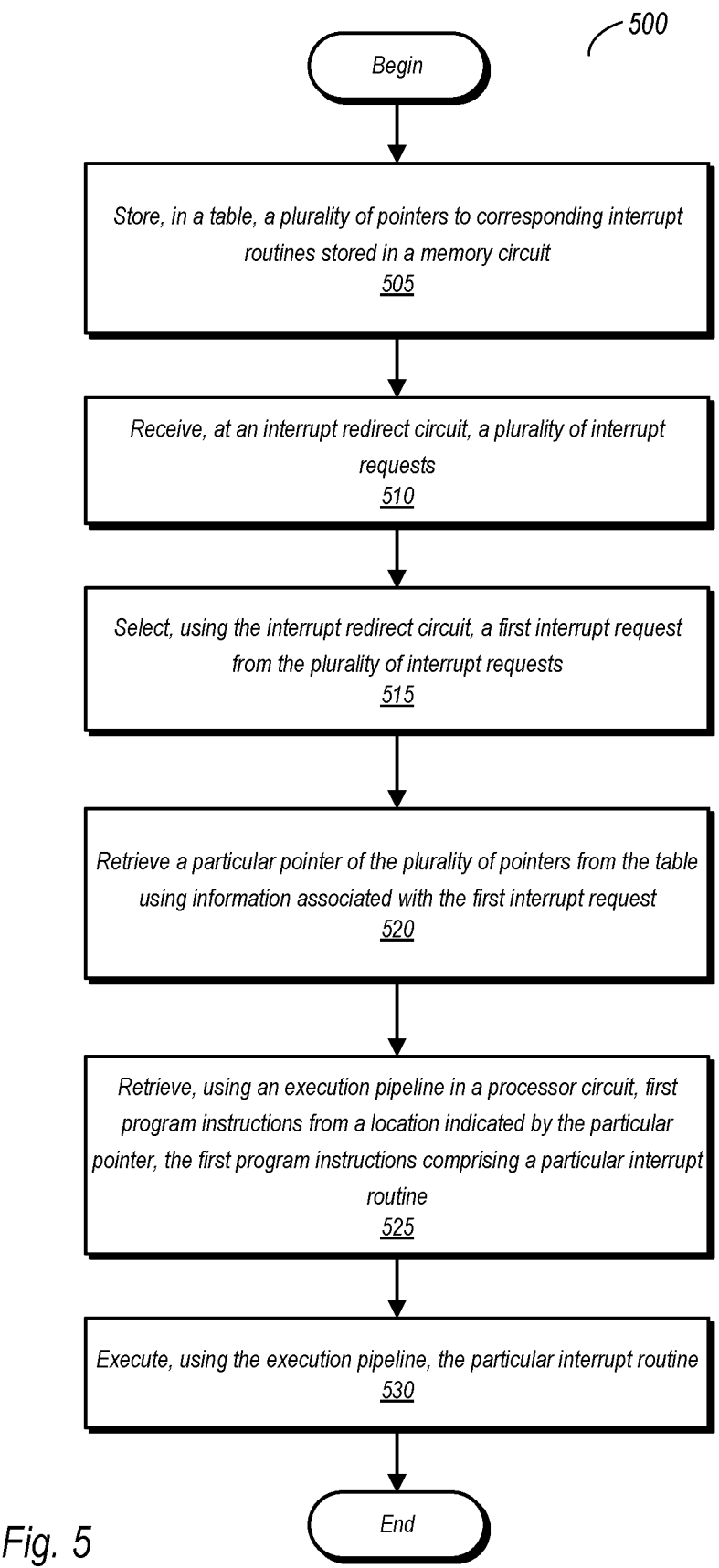
FIG. 5 is a flow diagram of one embodiment of a method for handling interrupts.

Methods for Operating an Interrupt Redirect Circuit:

FIG. 5 is a flow diagram of one embodiment of a method for operating an interrupt redirect circuit. Method 500 as discussed herein may apply to any of the various embodiments of a hardware interrupt redirect circuit as discussed above. Embodiments of an apparatus capable of carrying out Method 500 but not explicitly discussed herein may also be considered to fall within the scope of this disclosure.

Method 500 includes storing, in a table, a plurality of pointers corresponding to interrupt routines stored in a memory circuit (block 505). In one embodiment, the interrupt pointers may be stored in a closely coupled memory implemented in a processor. The interrupt routines may be stored in either the closely coupled memory or in main memory.

Method 500 further includes receiving, at an interrupt redirect circuit, a plurality of interrupt requests of a first type (block 510). The interrupt redirect circuit may be a dedicated hardware circuit that performs various functions related to a certain type or types of interrupts, and is separate and distinct from a standard interrupt handling/processing mechanism in the processor and/or operating system. For example, the interrupt redirect circuit may implement dedicated hardware for performing functions for vectored interrupts from requestors external to the processor. Meanwhile, the standard interrupt handling/processing mechanism associated with the processor/operating system may perform functions for polled interrupts. As the interrupt redirect circuit is implemented using dedicated hardware/circuitry for the functions performed therein, it may allow for the processing of interrupt requests significantly faster than the standard interrupt handling/processing mechanism.

Upon receiving interrupt requests, Method 500 further includes selecting, using the interrupt redirect circuit, a first interrupt request from the plurality of interrupt requests (block 515). In one embodiment, the interrupt redirect circuit includes arbitration circuitry that may perform arbitration among a number of interrupt requests and select a winning request based on, e.g., a priority level. The method further includes retrieving a particular pointer of the plurality of pointers from the table using information associated with the first interrupt request (block 520). Using the retrieved pointer, the method further includes retrieving, using an execution pipeline in a processor circuit, first program instructions from a location indicated by the particular pointer, the first program instructions comprising a particular interrupt routine (block 525). The location may be a memory address in which the first program instructions are stored, e.g., in a closely coupled memory or in a main memory. Upon retrieving the first program instructions, Method 500 further includes executing, using the execution pipeline, the particular interrupt routine (block 530).

In various embodiments, the method includes receiving the plurality of interrupt requests on ones of a corresponding plurality of signal paths external to the processor, wherein the plurality of interrupt requests are vectored interrupts. The method may further include the interrupt redirect circuit processing interrupt requests of the first type independently of the processor processing interrupts of a second type.

In processing interrupt requests, the method further includes causing, using the interrupt redirect circuit and in response to selecting the first interrupt request, a flush of the execution pipeline. Thereafter, the method includes causing execution of a load instruction in the execution pipeline to access the table to retrieve the particular pointer; and causing a stall of an instruction decoder in the execution pipeline. In various embodiments, the method includes storing the table in a closely coupled memory (CCM) implemented in the processor.

Embodiments of method 500 may also include determining an identity of the first interrupt request and selecting the first interrupt request, based on priority information, using arbitration circuitry. In such embodiments, the method also includes concatenating the first interrupt request with a corresponding base address to form an address corresponding to a location of the pointer in the table. Alternatively, the address corresponding to the location of the pointer may be calculated.

Figure 6:
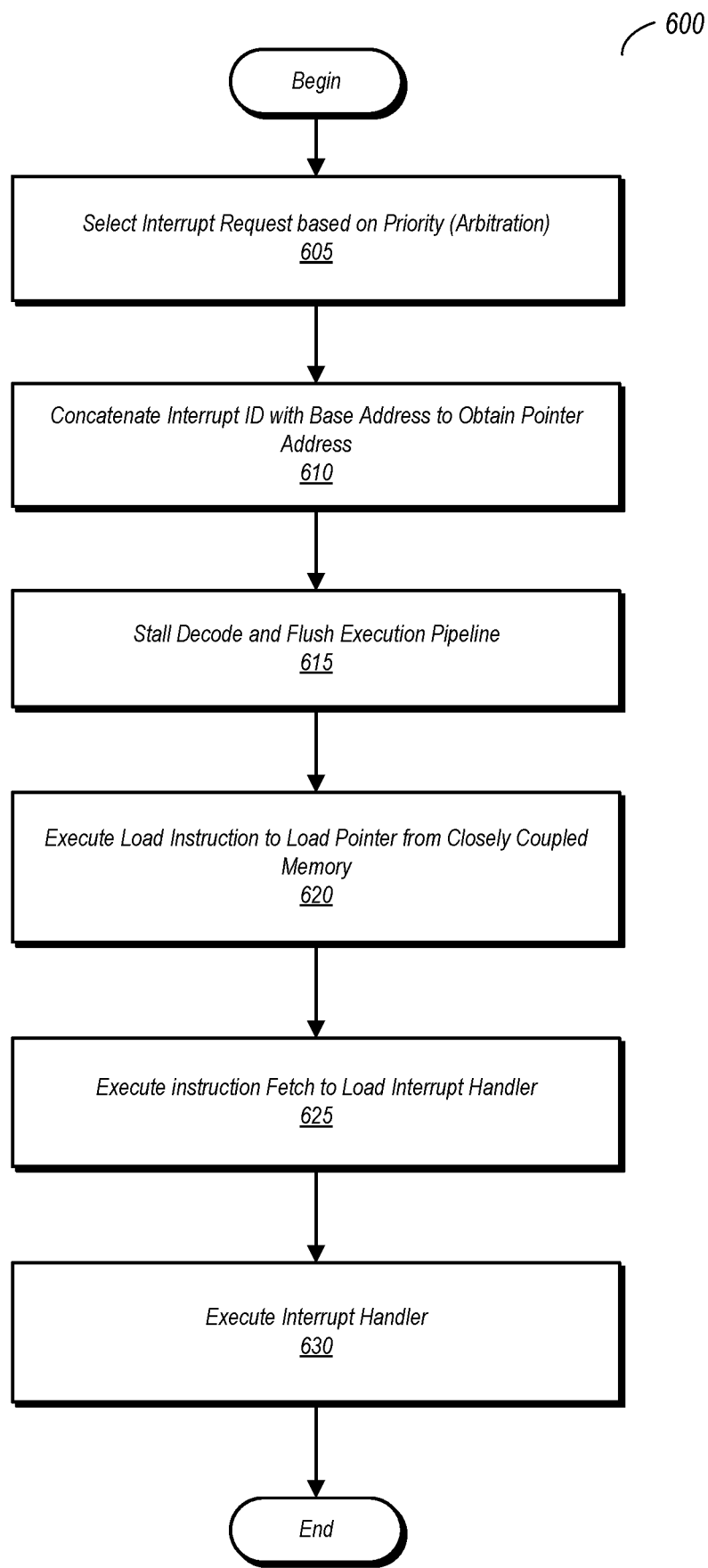
FIG. 6 is a flow diagram of another embodiment of a method for handling interrupts.

FIG. 6 is a flow diagram of another embodiment of a method for operating an interrupt redirect circuit. Method 600 as illustrated in FIG. 6 may be performed by various ones of the apparatus embodiments discussed above. Embodiments of an apparatus capable of carrying out Method 600, but not explicitly discussed herein may also be considered to fall within the scope of this disclosure.

Method 600 includes selecting an interrupt request based on a priority during arbitration (block 605). The selected interrupt may be one of a number of interrupts received by an interrupt redirect circuit. The method further includes concatenating an interrupt identifier with a base address to obtain an address of a pointer (block 610). The pointer in various embodiments may be stored in a closely coupled memory implemented in a processor. The method also includes stalling decode operations in an execution pipeline, and flushing the pipeline (block 615).

Using the address of the pointer, Method 600 further includes executing a load instruction to load the pointer from the closely coupled memory (block 620). The pointer in this embodiment indicates a location where a corresponding interrupt handler is stored. The location may also be in the closely coupled memory, or may be in a main system memory (and can thus be cached as well), among other places. Accordingly, Method 600 includes executing an instruction fetch to obtain the first instruction of interrupt handler from the location indicated by the pointer (block 625). Upon fetching the first instruction of the interrupt handler, the method continues with executing the interrupt handler (block 630). If the interrupt handler includes multiple instructions, then multiple fetches may be performed.

The present disclosure includes references to 37 an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure i.e., something physical))). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a processor circuit including an execution pipeline;
   a table configured to store a plurality of pointers to corresponding interrupt routines stored in a memory circuit; and
   an interrupt redirect circuit configured to:
      receive a first plurality of interrupt requests, wherein the interrupt requests are of a first type of interrupt request;
      select a first interrupt request of the first plurality of interrupt requests;
      cause retrieval of a particular pointer of the plurality of pointers from the table using information associated with the first interrupt request;
      determine an identification of the first interrupt request;
      concatenate the first interrupt request with a corresponding base address to form an address corresponding to a location of the pointer in the table; and wherein the execution pipeline is configured to retrieve first program instructions from the memory circuit using the particular pointer to execute a particular interrupt routine.

2. The apparatus of claim 1, wherein the interrupt redirect circuit is further configured to receive the first plurality of interrupt requests on ones of a corresponding plurality of signal paths external to the processor circuit.

3. The apparatus of claim 1, wherein the first plurality of interrupt requests are requests for vectored interrupts.

4. The apparatus of claim 1, wherein the interrupt redirect circuit includes arbitration circuitry configured to select the first interrupt request based on determining a priority level of the particular interrupt relative to one or more other ones of the first plurality of interrupt requests.

5. The apparatus of claim 1, wherein the processor circuit includes a closely coupled memory implemented in the processor circuit, wherein the table is stored in the closely coupled memory.

6. The apparatus of claim 1, wherein the memory circuit is a closely coupled memory implemented in the processor circuit, wherein one or more interrupt handlers corresponding to ones of the first plurality of interrupt requests, including the first program instructions, are stored in the closely coupled memory.

7. The apparatus of claim 1, wherein in response to selecting the first interrupt request, the interrupt redirect circuit is configured to cause a flush of the execution pipeline, and further configured to cause, in the pipeline, execution of a load instruction to cause an access to the table to retrieve the particular pointer.

8. The apparatus of claim 1, wherein the interrupt redirect circuit is configured to, in response to receiving an interrupt request, cause a stall of an instruction decoder in the execution pipeline.

9. The apparatus of claim 1, wherein the processor circuit is configured to: select a second interrupt of a second plurality of interrupt requests, wherein the second interrupt is of a second type of interrupt request; and load a particular value into a program counter included in the execution pipeline, wherein the particular value corresponds to a location of interrupt handler code; wherein the execution pipeline is further configured to retrieve second program instructions from the memory circuit using the particular value to execute the interrupt handler code; wherein the interrupt redirect circuit is configured to process interrupts of the first type independently of the processor circuit processing interrupts of the second type.

10. A method comprising:
storing, in a table, a plurality of pointers to corresponding interrupt routines stored in a memory circuit;
receiving, at an interrupt redirect circuit, a plurality of interrupt requests of a first type;
selecting, using the interrupt redirect circuit, a first interrupt request from the plurality of interrupt requests;
determine an identification of the first interrupt request;
concatenate the first interrupt request with a corresponding base address to form an address corresponding to a location of the pointer in the table;
retrieving a particular pointer of the plurality of pointers from the table using information associated with the first interrupt request;
retrieving, using an execution pipeline in a processor circuit, first program instructions from a location indicated by the particular pointer, the first program instructions comprising a particular interrupt routine; and executing, using the execution pipeline, the particular interrupt routine.

11. The method of claim 10, further comprising receiving the plurality of interrupt requests on ones of a corresponding plurality of signal paths external to the processor circuit, wherein the plurality of interrupt requests are vectored interrupts.

12. The method of claim 10, further comprising the interrupt redirect circuit processing interrupt requests of the first type independently of the processor circuit processing interrupts of a second type.

13. The method of claim 10, further comprising: causing, using the interrupt redirect circuit and in response to selecting the first interrupt request, a flush of the execution pipeline; causing a stall of an instruction decoder in the execution pipeline;
and causing execution of a load instruction in the execution pipeline to access the table to retrieve the particular pointer.

14. The method of claim 10, further comprising storing the table in a closely coupled memory (CCM) implemented in the processor circuit.

15. A system comprising:
a plurality of requestors configured to generate interrupt requests of a first type on corresponding ones of a plurality of interrupt request lines;
a processor circuit including an execution pipeline and further including a table configured to store a plurality of pointers to corresponding interrupt routines stored in a memory circuit; and
an interrupt redirect circuit configured to receive interrupt requests via the plurality of interrupt request lines, wherein the interrupt redirect circuit is configured to:
receive one or more interrupt requests from the plurality of requestors;
select a first interrupt request from the one or more interrupt requests; and cause retrieval of a particular pointer of the plurality of pointers from the table using information associated with the first interrupt request;
determine an identification of the first interrupt request;
concatenate the first interrupt request with a corresponding base address to form an address corresponding to a location of the pointer in the table;
wherein the execution pipeline is configured to retrieve first program instructions from the memory circuit using the particular pointer to execute a particular interrupt handler routine.

16. The system of claim 15, wherein the processor circuit is configured to handle interrupts of a second type, and wherein the interrupt redirect circuit is configured to handle interrupt requests of the first type independently of the processor circuit handling interrupt requests of the second type.

17. The system of claim 15, wherein the processor circuit includes a closely coupled memory, wherein the table is stored in the closely coupled memory.

18. The system of claim 15, wherein the interrupt requests of the first type are vectored interrupts.

19. An apparatus, comprising:
a processor circuit including an execution pipeline;
a table configured to store a plurality of pointers to corresponding interrupt routines stored in a memory circuit; and
an interrupt redirect circuit configured to:
receive a first plurality of interrupt requests, wherein the interrupt requests are of a first type of interrupt request;

select a first interrupt request of the first plurality of interrupt requests; cause retrieval of a particular pointer of the plurality of pointers from the table using information associated with the first interrupt request; and wherein the execution pipeline is configured to retrieve first program instructions from the memory circuit using the particular pointer to execute a particular interrupt routine; and wherein in response to selecting the first interrupt request, the interrupt redirect circuit is configured to cause a flush of the execution pipeline, and further configured to cause, in the pipeline, execution of a load instruction to cause an access to the table to retrieve the particular pointer.

\* \* \* \* \*